United States Patent
Sakai et al.

(10) Patent No.: US 10,707,795 B2
(45) Date of Patent: Jul. 7, 2020

(54) ROTARY ELECTRIC MACHINE SYSTEM, ROTARY ELECTRIC MACHINE SYSTEM-INSTALLED VEHICLE, AND METHOD FOR MANUFACTURING ROTARY ELECTRIC MACHINE SYSTEM

(71) Applicant: HONDA MOTOR CO., LTD., Tokyo (JP)

(72) Inventors: Motonori Sakai, Wako (JP); Masashi Inoue, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/267,472

(22) Filed: Feb. 5, 2019

(65) Prior Publication Data
US 2019/0245468 A1 Aug. 8, 2019

(30) Foreign Application Priority Data
Feb. 6, 2018 (JP) .................. 2018-018951

(51) Int. Cl.
*G01R 31/02* (2006.01)
*H02H 3/04* (2006.01)
(Continued)

(52) U.S. Cl.
CPC .............. *H02P 21/22* (2016.02); *H02K 1/16* (2013.01); *H02K 1/2766* (2013.01); *H02K 7/006* (2013.01);
(Continued)

(58) Field of Classification Search
CPC ......................... G05B 13/0285; G05B 19/4141
(Continued)

(56) References Cited

U.S. PATENT DOCUMENTS

2003/0184245 A1* 10/2003 Arimitsu ............... H02P 6/085
318/268
2008/0246426 A1* 10/2008 Aoki ............... H02M 7/53873
318/461
(Continued)

FOREIGN PATENT DOCUMENTS

JP   H07-212915 A   8/1995
JP   2008-238946 A  10/2008
(Continued)

OTHER PUBLICATIONS

Japanese Office Action dated Jun. 4, 2019 (4 pages).

*Primary Examiner* — Erick D Glass
(74) *Attorney, Agent, or Firm* — Rankin, Hill & Clark LLP (57) ABSTRACT

A stable-quality rotary electric machine system in which one or more rotary electric machine characteristics are normalized from various viewpoints. The rotary electric machine system is provided with: a rotary electric machine having a rotor, a stator, and a stator coil; and a controller configured to execute drive control of the rotary electric machine. The controller applies, to a drive control signal for the rotary electric machine, normalization information, which normalizes the drive control signal for the rotary electric machine, derived by comparing specific information about a value correlated to an induced voltage occurring in the stator coil when the rotor of the rotary electric machine is driven under prescribed conditions and predetermined reference information about the value correlated to the induced voltage occurring in the stator coil. Then, the drive control signal normalized by the application is used to execute the drive control of the rotary electric machine.

8 Claims, 7 Drawing Sheets

(51) Int. Cl.
  *H02H 7/08* (2006.01)
  *H02P 21/22* (2016.01)
  *H02P 21/20* (2016.01)
  *H02P 21/14* (2016.01)
  *H02K 1/27* (2006.01)
  *H02K 11/33* (2016.01)
  *H02K 7/00* (2006.01)
  *H02K 1/16* (2006.01)
  *H02K 15/03* (2006.01)
  *H02K 11/27* (2016.01)

(52) U.S. Cl.
  CPC ............. *H02K 11/33* (2016.01); *H02K 15/03* (2013.01); *H02P 21/141* (2013.01); *H02P 21/20* (2016.02); *H02K 11/27* (2016.01)

(58) Field of Classification Search
  USPC .......................................................... 318/490
  See application file for complete search history.

(56) References Cited

U.S. PATENT DOCUMENTS

2011/0057591 A1* 3/2011 Tagome .................. B60L 50/51
                                                     318/400.23
2019/0305711 A1* 10/2019 Kubota .................. H02P 21/24

FOREIGN PATENT DOCUMENTS

| JP | 2012-223009 A | 11/2012 |
| JP | 2013-085407 A | 5/2013 |
| JP | 2014-023338 A | 2/2014 |

\* cited by examiner

FIG.2

ROTARY ELECTRIC MACHINE SYSTEM, ROTARY ELECTRIC MACHINE SYSTEM-INSTALLED VEHICLE, AND METHOD FOR MANUFACTURING ROTARY ELECTRIC MACHINE SYSTEM

TECHNICAL FIELD

The present invention relates to a rotary electric machine system in which one or more rotary electric machine characteristics, including torque characteristics of the rotary electric machine, are normalized, a vehicle-installed rotary electric machine system, and a method for manufacturing the rotary electric machine system.

BACKGROUND ART

Nowadays, widely used are vehicles carrying a rotary electric machine in addition to or instead of an internal-combustion engine as a drive source.

Examples of the vehicles include what is called hybrid electric vehicles and electric vehicles.

JP2014-23338A disclosed an invention of a rotary electric machine system having: a permanent magnet motor (rotary electric machine) having a rotor equipped with permanent magnets, a stator facing the outer circumferential surface of the rotor with a gap therebetween, and a stator coil by which each tooth of the stator is wound; and a control unit configured to execute drive control of the rotary electric machine.

In the rotary electric machine system of JP2014-23338A, the rotary electric machine is driven by controlling a d-axis current component and a q-axis current component on the basis of vector control. When the rotary electric machine is driven, the d-axis current component and the q-axis current component are calculated on the basis of an operation state of the rotary electric machine and a magnet temperature in the permanent magnet motor is calculated. When the calculated magnet temperature is lower than a predetermined value, the d-axis current component is added so as to more magnetize each magnet, and the rotary electric machine is operated.

According to the rotary electric machine system of JP2014-23338A, the magnet temperature can be rapidly increased and permanent demagnetization of each magnet can be prevented without causing any torque pulsation and noise.

SUMMARY OF INVENTION

A first aspect of the invention provides a rotary electric machine system comprising:

a rotary electric machine including a rotor that is provided on a drive shaft and is equipped with permanent magnets, a stator disposed to face an outer circumferential surface of the rotor with a gap therebetween, and a stator coil wound around each tooth of the stator; and a control unit configured to generate a drive control signal for the rotary electric machine and execute drive control of the rotary electric machine by using the drive control signal generated, the control unit comprising an information setting section to which normalization information to normalize the drive control signal for the rotary electric machine is set, the normalization information being derived by comparing specific information about a value correlated to an induced voltage generated in the stator coil when the rotor of the rotary electric machine is driven under prescribed conditions and predetermined reference information about the value correlated to the induced voltage generated in the stator coil, wherein the normalization information is applied to the drive control signal generated and the resulting drive control signal normalized by the application is used to execute the drive control of the rotary electric machine.

In the first aspect, the control unit applies, to the drive control signal for the rotary electric machine, the normalization information (so as to normalize the drive control signal for the rotary electric machine) derived by comparing specific information about a value correlated to an induced voltage occurring in the stator coil when the rotor of the rotary electric machine is driven under prescribed conditions and predetermined reference information about the value correlated to the induced voltage occurring in the stator coil. Then, the drive control signal normalized by the application is used to execute the drive control of the rotary electric machine.

Note that the normalization information means information used to evaluate whether or not the specific information about a value correlated to an induced voltage occurring in the stator coil when the rotor of the rotary electric machine is driven under prescribed conditions converges in a normal distribution range (whether or not the specific information is out of the normal range).

In addition, the normalization information is information used to convert, to a drive control signal that can be fit (normalized) for normal operation of the rotary electric machine, a drive control signal that causes abnormal events during operation of the rotary electric machine if the signal is used as it is.

According to the first aspect of the present invention, the drive control signal, which has been normalized with respect to the value correlated to the induced voltage occurring in the stator coil when the rotor of the rotary electric machine is driven under prescribed conditions, is used to execute the drive control of the rotary electric machine. Thus, a stable-quality rotary electric machine system, in which one or more rotary electric machine characteristics are normalized from various viewpoints, can be obtained.

DESCRIPTION OF EMBODIMENTS

Prior to describe embodiments of the present invention, the prior art earlier described is further argued below.

When a rotary electric machine system with stable quality is subject to mass production, it is required to normalize, from various viewpoints, one or more rotary electric machine characteristics including torque characteristics of the rotary electric machine. In this respect, it is described in the rotary electric machine system of JP2014-23338A that the driving current is controlled on the basis of the magnet temperature, which is one of the viewpoints related to the rotary electric machine characteristics.

However, JP2014-23338A neither discloses nor suggests the other viewpoints (except for the magnet temperature) that are related to the rotary electric machine characteristics and help normalize the rotary electric machine characteristics.

Embodiments have been made in light of the above situation. An aspect of the present invention provides a stable-quality rotary electric machine system in which one or more rotary electric machine characteristics are normalized from various viewpoints and a vehicle carrying the rotary electric machine system.

In addition, the embodiment of the present invention provides a method for manufacturing a stable-quality rotary electric machine system in which one or more rotary electric machine characteristics are normalized from various viewpoints and which can be subject to mass production.

The embodiments of present invention make it possible to provide a stable-quality rotary electric machine system in which one or more rotary electric machine characteristics are normalized from various viewpoints.

With reference to the Drawings, the following describes, in detail, a rotary electric machine system according to an embodiment of the present invention, a vehicle carrying the rotary electric machine system, and a method for manufacturing the rotary electric machine system.

Note that in the following figures, the same members or corresponding members have the same reference numerals. In addition, the size and form of each member may be modified or schematically exaggerated for description convenience.

[Overview of Rotary Electric Machine System 11 According to Embodiment of Present Invention]

First, with reference to the Drawings, the following describes an overview of a rotary electric machine system 11 according to an embodiment of the present invention.

Figure 1:
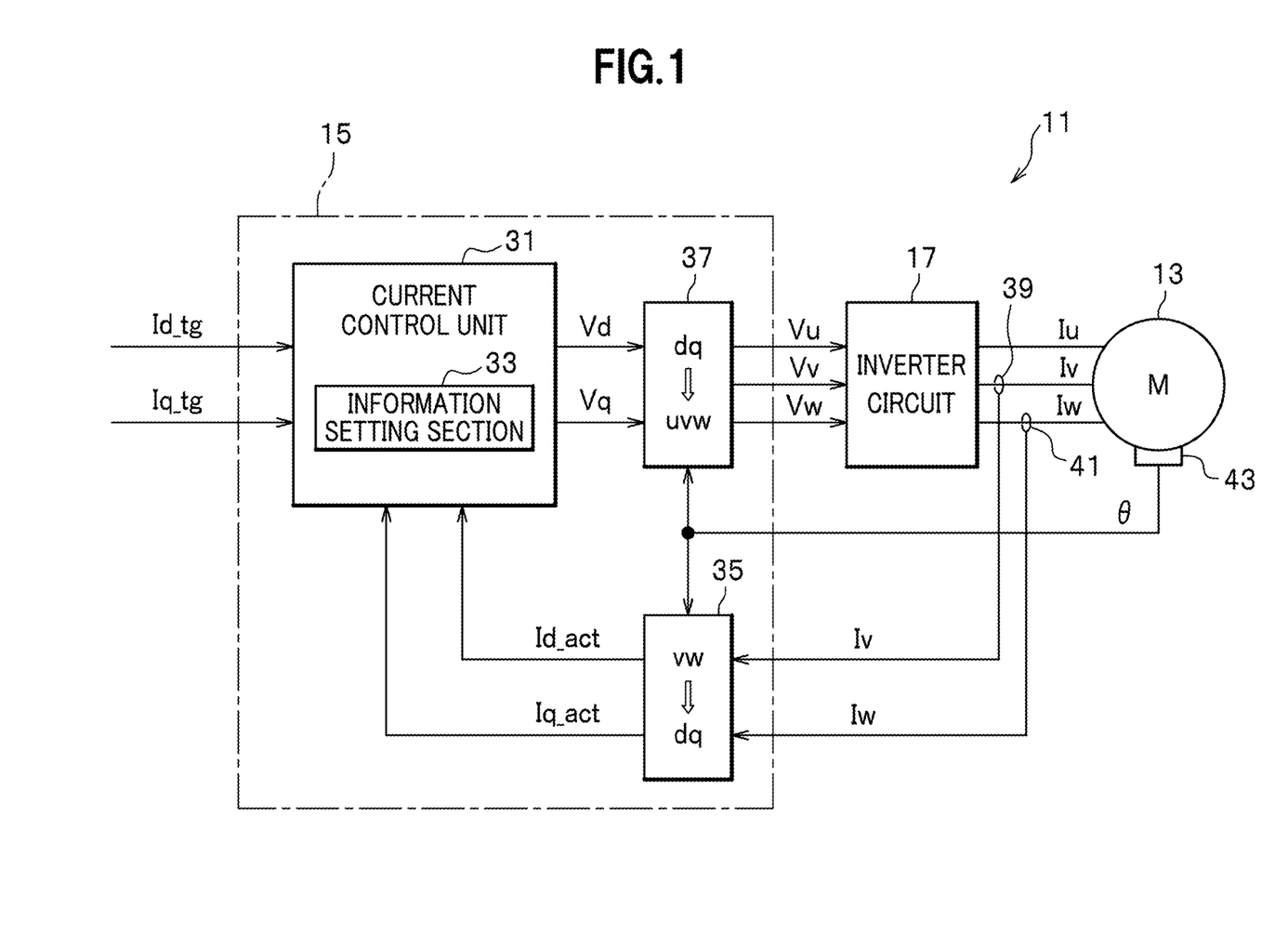
FIG. 1 is a block diagram showing an overview of a rotary electric machine system according to an embodiment of the present invention.
Figure 2:
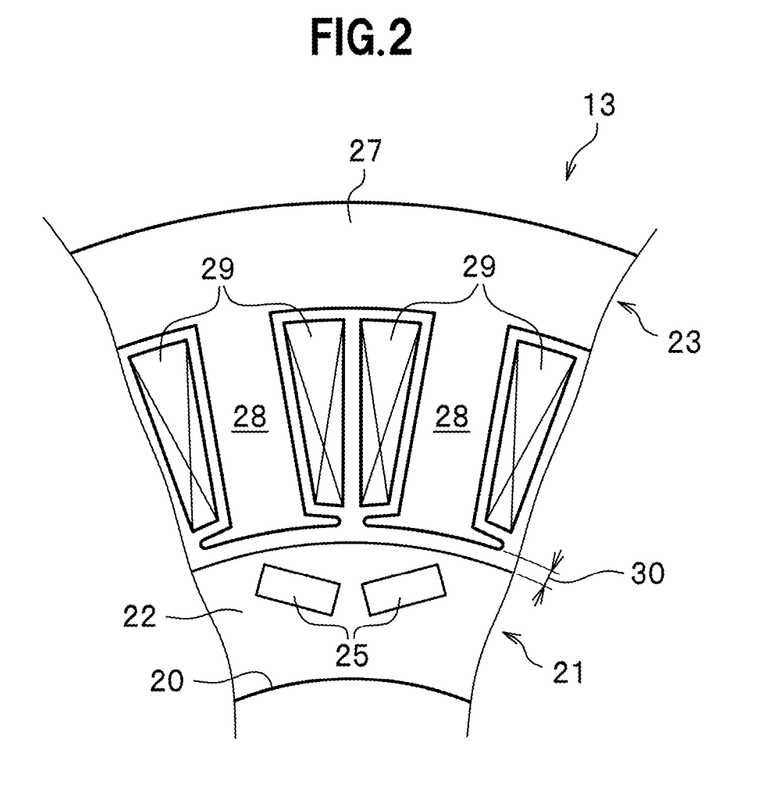
FIG. 2 is a schematic enlarged view of a main portion of a rotary electric machine constituting a machine element of the above rotary electric machine system.

FIG. 1 is a block diagram showing an overview of the rotary electric machine system 11 according to this embodiment. FIG. 2 is a schematic enlarged view of a main portion of a rotary electric machine 13 constituting a machine element of the rotary electric machine system 11 according to this embodiment.

As shown in FIG. 1, the rotary electric machine system 11 according to this embodiment is configured by including: the rotary electric machine 13 constituting a machine element of the rotary electric machine system 11; a controller 15 constituting a control element of the rotary electric machine system 11; and an inverter circuit 17. As the rotary electric machine 13, a three-phase DC brushless motor, for instance, is preferably used. The rotary electric machine 13 is used as an electric motor and/or an electric power generator that a vehicle (not shown) carries.

As shown in FIG. 2, the rotary electric machine 13 is configured by including: a rotor 21 provided on the outer circumference of a drive shaft 20; and a stator 23 facing the outer circumferential surface of the rotor 21 with a small gap 30 therebetween.

The rotor 21 has permanent magnets 25 embedded, in an annular rotor core 22, along the outer circumferential edge thereof. The rotor core 22 is formed by stacking magnetic steel sheets in the extending direction of the drive shaft 20. On the inner circumference side of the rotor core 22 is attached the drive shaft 20. Examples of the permanent magnets 25 that are preferably used include, but are not particularly limited to, rare-earth sintered magnets such as neodymium magnets.

The stator 23 is configured such that a plurality of teeth 28 facing the rotor 21 are integrally provided, like a comb, from an annular stator core 27. The stator core 27 is formed by stacking magnetic steel sheets in the extending direction of the drive shaft 20. Each tooth 28 is wound by three-phase (U-phase, V-phase, and W-phase) windings, namely stator coils 29.

The rotary electric machine 13 has an identification information (e.g., a product number) mark that makes it possible to identify the main body of each individual rotary electric machine 13. The identification information given to each rotary electric machine 13 is managed such that unique specific information and normalization information (described in detail below) are assigned to each rotary electric machine 13.

The rotary electric machine 13 has power lines on the input side, which line is provided with a v-phase current sensor 39 that detects a v-phase current Iv value and which line is provided with a w-phase current sensor 41 that detects a w-phase current Iw value. Information about the v-phase current Iv value that is detected by the v-phase current sensor 39 and information about the w-phase current value that is detected by the w-phase current sensor 41 are sent to the controller 15.

When given drive control signals (Iu, Iv, and Iw; see FIG. 2) are supplied to the respective phase stator coils 29, the stator 23 generates a rotating magnetic field. In the rotary electric machine 13, the rotating magnetic field as so generated interacts with the magnetic field generated by the permanent magnets 25 to produce force in accordance with the interaction. This force causes the rotor 21 to rotate and thus outputs torque to the drive shaft 20.

The controller 15, as shown in FIG. 1, is configured by including a current control unit 31, a voltage coordinate conversion unit 35, and a current coordinate conversion unit 37.

The current control unit 31 controls a current supplied to the rotary electric machine 13 from the viewpoints of: torque commands Id_tg and Iq_tg based on acceleration/deceleration operation by a driver of a vehicle; driving state information (about an actual excitation current value Id_act and an actual torque current value Iq_act) of the rotary electric machine 13; and values correlated to an induced voltage IV occurring in the stator coil 29 when the rotor 21 is driven under prescribed conditions (e.g., when the rotor 21 is maintained at a predetermined rotation speed) among rotary electric machine characteristics including torque characteristics of the rotary electric machine 13. How the current control unit 31 specifically works is described in detail below.

In the rotary electric machine system 11 according to this embodiment, the current control unit 31 of the controller 15 controls, using a vector control method, the amplitude and phase of a current supplied to the rotary electric machine 13.

For the vector control of the rotary electric machine 13, usually used is a technique using a two-dimensional (d-axis and q-axis) orthogonal vector coordinate system so as to control an excitation current (d-axis current) that controls the strength of a magnetic field and a torque current (q-axis current) that generates torque. The d-axis is an axis in the direction of magnetic flux generated by the permanent magnets 25 provided in the rotor 21 of the rotary electric machine 13. The q-axis is an axis electrically perpendicular to the d-axis.

Here, from the viewpoints of values correlated to an induced voltage IV occurring in the stator coil 29 when the rotor 21 is driven under prescribed conditions, it is explained what significance is given by controlling a current supplied to the rotary electric machine 13.

Provided that when the rotor 21 is driven under prescribed conditions, an induced voltage IV occurs in the stator coil 29. This is because a change in the magnetic field generated by the permanent magnets 25 of the rotor 21 causes an electromotive force in the stator coil 29. The magnitude of this induced voltage (electromotive force) IV is a value specific to each individual rotary electric machine 13.

Meanwhile, the present inventors' research has revealed that the magnitude of the induced voltage IV occurring in the stator coil 29 is well correlated to the amount WB of magnetic flux of the rotor 21 (hereinafter, sometimes referred to, in short, as a "rotor magnetic flux amount") and the length AG of a gap 30 provided between the outer circumferential surface of the rotor 21 and the inner circumference surface of the stator 23 (hereinafter, sometimes referred to, in short, as a "gap size").

From the above findings, the present inventors are confident that the values correlated to the induced voltage IV generated in the stator coil 29 are each useful as one of the rotary electric machine characteristics to be normalized.

Note that as used herein, the "values correlated to the induced voltage IV generated in the stator coil 29" involve a comprehensive concept including, of course, a measured value for the induced voltage IV generated in the stator coil 29 as well as a measured value for the rotor magnetic flux amount WB, a measured value for the gap size AG, and an estimated value for the induced voltage IV generated in the stator coil 29 as estimated using both the measured value for the rotor magnetic flux amount WB and the measured value for the gap size AG.

As described previously, when a stable-quality rotary electric machine system 11 is subject to mass production, it is important to normalize the rotary electric machine characteristics including torque characteristics of the rotary electric machine 13 from various viewpoints.

Here, the present invention discloses, as one of the useful rotary electric machine characteristics, each value correlated to an induced voltage IV generated in the stator coil 29 when the rotor 21 is driven under prescribed conditions.

Now, back to FIG. 1 and the following describes that the current control unit 31 of the controller 15 is configured by including an information setting section 33. The information setting section 33 is configured to set (store) normalization information so as to normalize a drive control signal for the rotary electric machine 13, the drive control signal being generated by the current control unit 31, the normalization information being derived by comparing specific information about a value correlated to an induced voltage occurring in the stator coil 29 and predetermined reference information about the value correlated to the induced voltage occurring in the stator coil 29.

The normalization information is information used to convert, to a drive control signal that can be fit (normalized) for normal operation of the rotary electric machine 13, a drive control signal that causes abnormal events (disturbance) during operation of the rotary electric machine 13 if the signal is used as it is. A normalization information data form may be appropriately set in such a format as to fit for a drive control signal data form. Examples of the normalization information format that can be suitably adopted include, but are not particularly limited to, map forms, lookup table forms, and relational formats. The normalization information may be suitably determined by a preparatory experiment or simulation. The normalization information is set (stored) in the information setting section 33 and, if necessary, may be suitably read and referred to.

The current coordinate conversion unit 35 uses information about a rotation angle θ of the drive shaft 20, which angle is detected by a resolver 43, to convert the three-phase currents (Iu, Iv, and Iw), which have been detected by the v-phase current sensor 39 and the w-phase current sensor 41, to an actual excitation current (actual d-axis current) Id_act and an actual torque current (actual q-axis current) Iq_act. The actual excitation current Id_act and the actual torque current Iq_act, which have been converted by the current coordinate conversion unit 35, are given to the current control unit 31 as feedback.

An excitation voltage command value Vd1 and a torque voltage command value Vq1 that have been normalized by the current control unit 31 are input into the voltage coordinate conversion unit 37. The voltage coordinate conversion unit 37 uses information about a rotation angle θ of the drive shaft 20, which angle is detected by the resolver 43, to convert the excitation voltage command value Vd1 and the torque voltage command value Vp1, which have been input from the current control unit 31, to three-phase voltage command values (Vu, Vv, and Vw). The three-phase voltage command values (Vu, Vv, and Vw), which have been converted by the voltage coordinate conversion unit 37, are sent to the inverter circuit 17.

The inverter circuit 17 is a circuit in which electric power supplied to each of the three-phase (U-phase, V-phase, and W-phase) stator coils 29 is generated. The inverter circuit 17 is configured by including a plurality of switching elements and inversely connected diodes. The inverter circuit 17 serves to convert electric power between DC electric power and AC electric power.

[How Rotary Electric Machine System 11 According to Embodiment of the Present Invention Works]

<<Basic Operation>>

Figure 3:
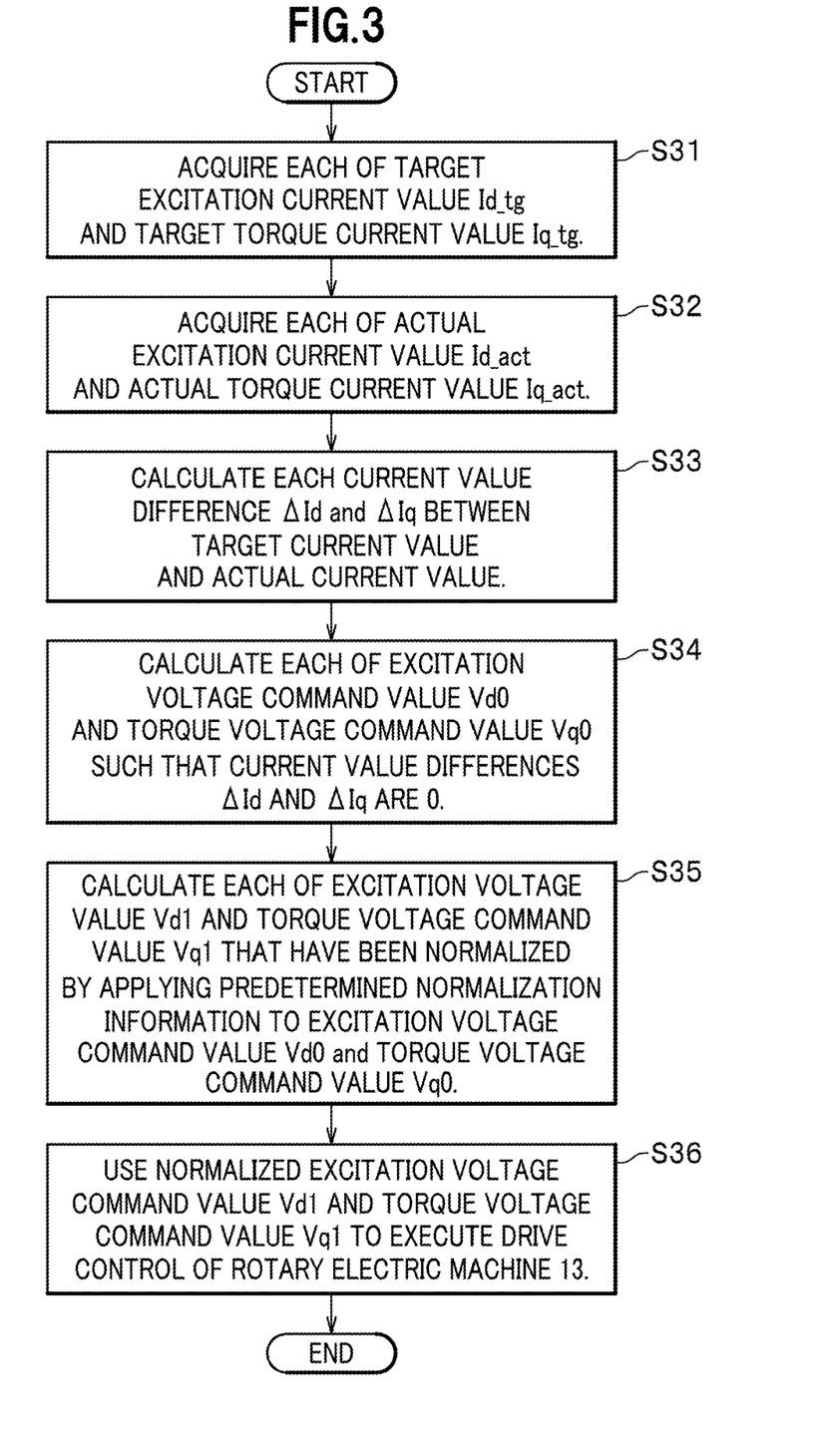
FIG. 3 is a flowchart illustrating how a rotary electric machine system according to an embodiment of the present invention basically works.

First, with reference to FIG. 3, the following describes basic operation of a rotary electric machine system 11 according to an embodiment of the present invention. FIG. 3 is a flowchart illustrating how the rotary electric machine system 11 according to this embodiment basically works.

At step S31 of FIG. 3, the current control unit 31 acquires each of a target excitation current value Id_tg and a target torque current value Iq_tg as torque commands based on acceleration/deceleration operation by a driver of a vehicle.

At step S32, the current control unit 31 acquires each of an actual excitation current value Id_act and an actual torque current value Iq_act as driving state information on the rotary electric machine 13.

At step S33, the current control unit 31 calculates an excitation current value difference ΔId and a torque current value difference ΔIq, which are each a current value difference between the target current value acquired at step S31 and the actual current value acquired at step S32.

At step S34, the current control unit 31 calculates each of an excitation voltage command value Vd0 and a torque voltage command value Vq0 such that the excitation current value difference ΔId and the torque current value difference ΔIq are set to be 0.

At step S35, the current control unit 31 calculates each of an excitation voltage command value Vd1 and a torque voltage command value Vq1, which are normalized by applying predetermined normalization information to the excitation voltage command value Vd0 and the torque voltage command value Vq0.

At step S36, the controller 15 works together with the inverter circuit 17 and uses the normalized excitation voltage command value Vd1 and the normalized torque voltage command value Vq1 to execute drive control of the rotary electric machine 13.

The above has illustrated how the rotary electric machine system 11 according to this embodiment basically works.

<<Applied Operation>>

Figure 4:
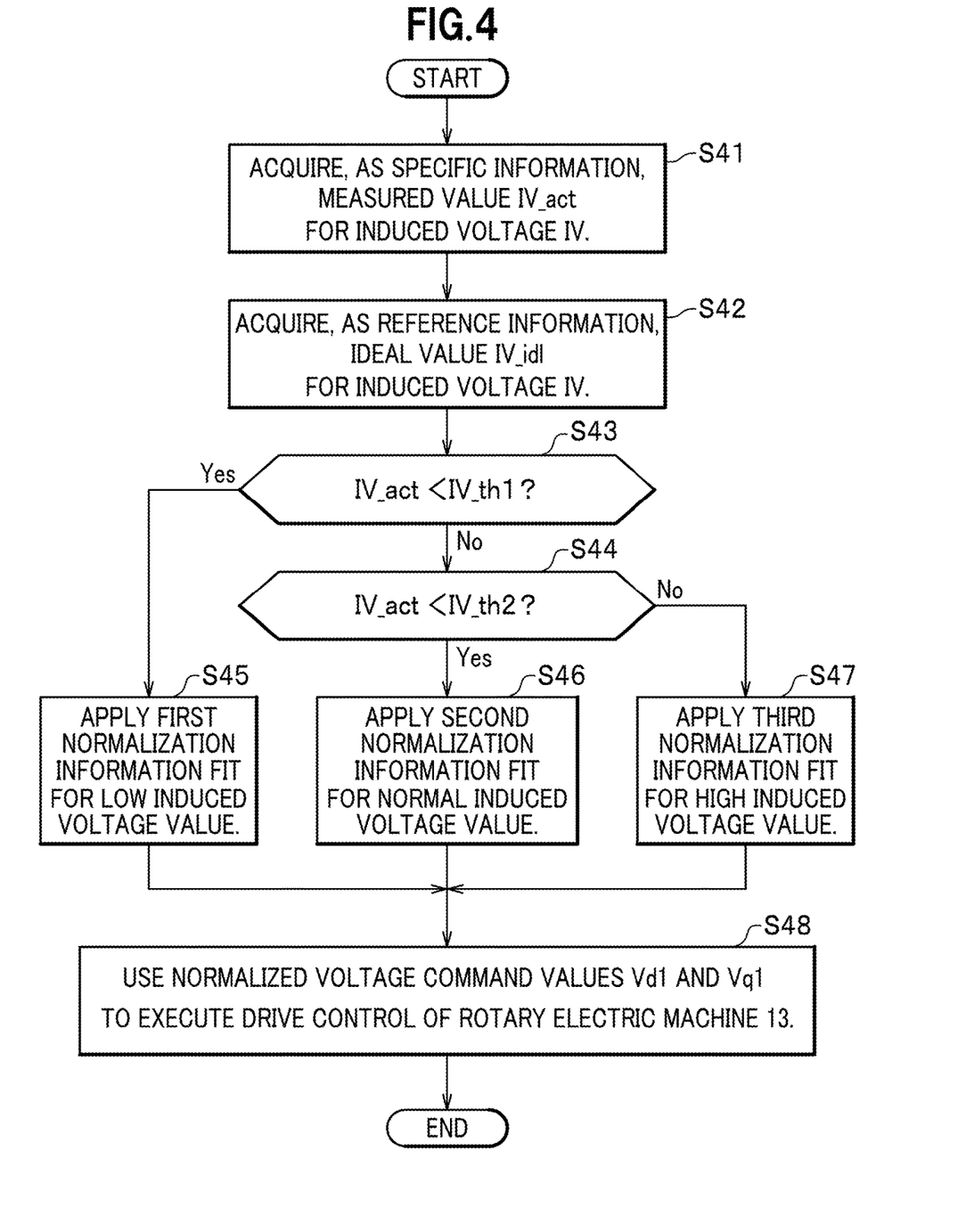
FIG. 4 is a flowchart illustrating how a controller according to a first embodiment works, which controller constitutes a control element for the above rotary electric machine system.
Figure 5:
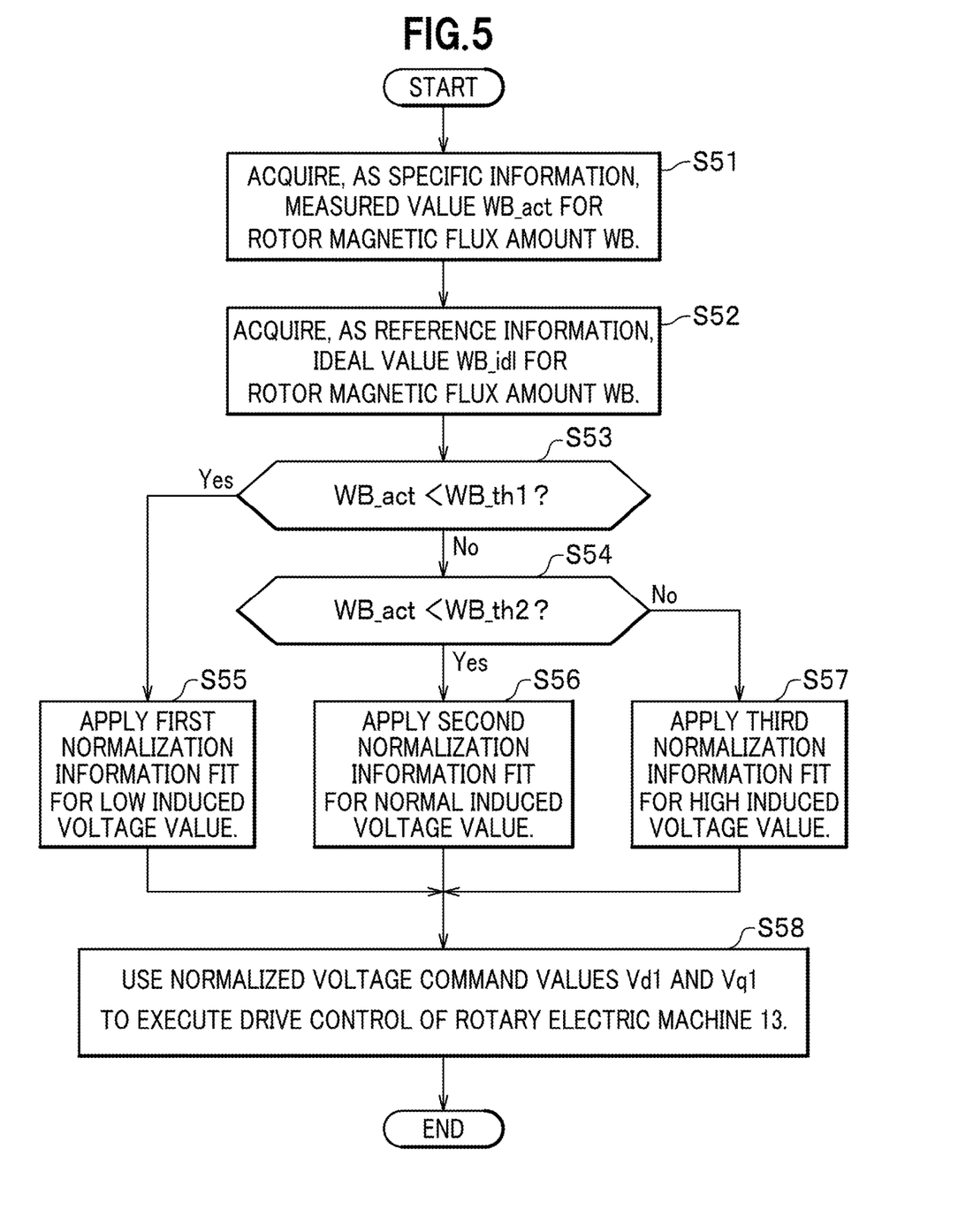
FIG. 5 is a flowchart illustrating how a controller according to a second embodiment works, which controller constitutes a control element for the above rotary electric machine system.
Figure 6:
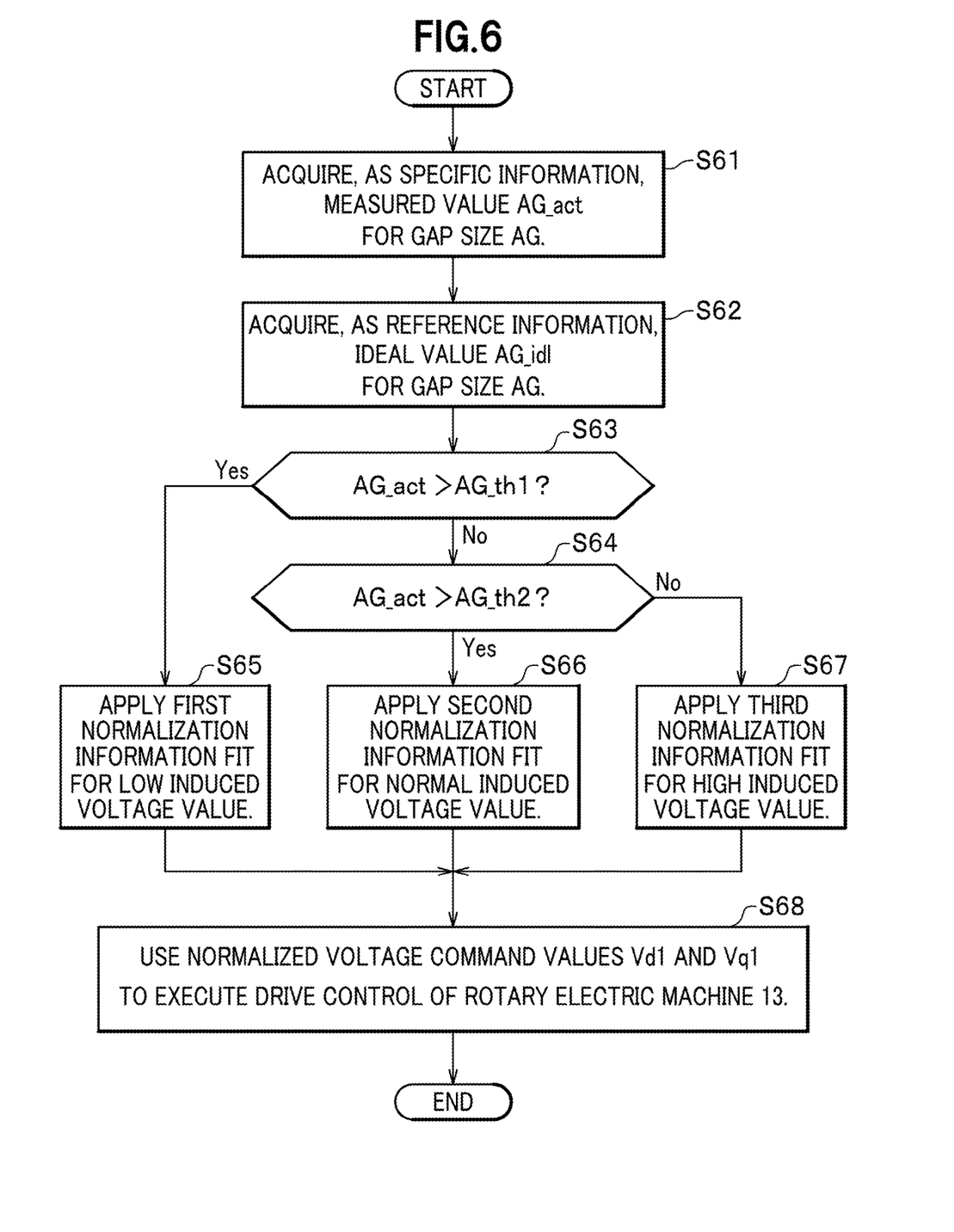
FIG. 6 is a flowchart illustrating how a controller according to a third embodiment works, which controller constitutes a control element for the above rotary electric machine system.

Next, with reference to FIGS. 4 to 6, the following describes applied operation of the rotary electric machine system 11 according to this embodiment.

In the rotary electric machine system 11 according to this embodiment, controllers 15 according to the first to third embodiments are employed depending on each individual rotary electric machine characteristic that is subject to normalization.

First Embodiment

FIG. 4 is a flowchart illustrating how a controller 15 according to the first embodiment works in which an induced voltage IV generated in the stator coil 29 when the rotor 21 is driven under prescribed conditions is used as the rotary electric machine characteristic that is subject to normalization.

At step S41 of FIG. 4, the current control unit 31 acquires, as specific information, a measured value IV_act for the induced voltage IV generated in the stator coil 29 when the rotor 21 is driven under prescribed conditions.

At step S42, the current control unit 31 acquires, as reference information, an ideal value IV_id1 for the induced voltage IV generated in the stator coil 29 when the rotor 21 is driven under prescribed conditions.

At step S43, the current control unit 31 determines whether or not the measured value IV_act (specific information) for the induced voltage IV as acquired at step S41 is smaller than a first induced voltage threshold IV_th1 set based on the ideal value IV_id1 (reference information) for the induced voltage IV as acquired at S42.

Note that the first induced voltage threshold IV_th1 may be set to be a lower limit of a normal distribution range (corresponding to reference information) in which the ideal value IV_id1 for the induced voltage IV is the median and there are appropriate upper and lower margins.

If the results of the determination at step S43 indicate that the measured value IV_act for the induced voltage IV is smaller than the first induced voltage threshold IV_th1, that is, if the measured value IV_act for the induced voltage IV is within a low induced voltage value range that is less than the lower limit of the normal distribution range, the current control unit 31 makes the process jump to step S45.

Meanwhile, if the results of the determination at step S43 indicate that the measured value IV_act for the induced voltage IV is the first induced voltage threshold IV_th1 or more, the current control unit 31 makes the process go to the next step S44.

At step S44, the current control unit 31 determines whether or not the measured value IV_act for the induced voltage IV is smaller than a second induced voltage threshold IV_th2.

Note that the second induced voltage threshold IV_th2 may be set to be an upper limit of the normal distribution range in which the ideal value IV_id1 for the induced voltage IV is the median and there are the upper and lower margins.

If the results of the determination at step S44 indicate that the measured value IV_act for the induced voltage IV is smaller than the second induced voltage threshold IV_th2, that is, if the measured value IV_act for the induced voltage IV is within a normal induced voltage value range in which the measured value IV_act for the induced voltage IV converges in the normal distribution range, the current control unit 31 makes the process jump to step S46.

Meanwhile, if the results of the determination at step S44 indicate that the measured value IV_act for the induced voltage IV is the second induced voltage threshold IV_th2 or more, that is, if the measured value IV_act for the induced voltage IV is within a high induced voltage value range that is equal to or more than the upper limit of the normal distribution range, the current control unit 31 makes the process jump to step S47.

At step S45, the current control unit 31 applies first normalization information fit for the low induced voltage value as normalization information set in the information setting section 33.

At step S46, the current control unit 31 applies second normalization information fit for the normal induced voltage value as normalization information set in the information setting section 33.

At step S47, the current control unit 31 applies third normalization information fit for the high induced voltage value as normalization information set in the information setting section 33.

At step S48, the controller 15 uses the voltage command values Vd1 and Vq1, which have been normalized by using one of the first to third normalization information, to execute drive control of the rotary electric machine 13.

Second Embodiment

FIG. 5 is a flowchart illustrating how a controller 15 according to the second embodiment works in which a measured value WB_act for the rotor magnetic flux amount WB is used as the rotary electric machine characteristic that is subject to normalization.

At step S51 of FIG. 5, the current control unit 31 acquires, as specific information, a measured value WB_act for the rotor magnetic flux amount WB.

At step S52, the current control unit 31 acquires, as reference information, an ideal value WB_id1 for the rotor magnetic flux amount WB.

At step S53, the current control unit 31 determines whether or not the measured value WB_act (specific information) for the rotor magnetic flux amount WB as acquired at step S51 is smaller than a first rotor magnetic flux amount threshold WB_th1 set based on the ideal value WB_id1 (reference information) for the rotor magnetic flux amount WB as acquired at S52.

Note that the first rotor magnetic flux amount threshold WB_th1 may be set to be a lower limit of a normal distribution range (corresponding to reference information) in which the ideal value WB_id1 for the rotor magnetic flux amount WB is the median and there are appropriate upper and lower margins.

If the results of the determination at step S53 indicate that the measured value WB_act for the rotor magnetic flux amount WB is smaller than the first rotor magnetic flux amount threshold WB_th1, that is, if the measured value WB_act for the rotor magnetic flux amount WB is within a low rotor magnetic flux amount (low induced voltage value) range that is less than the lower limit of the normal distribution range, the current control unit 31 makes the process jump to step S55.

Here, the rotor magnetic flux amount WB is highly correlated to the induced voltage IV generated in the stator coil 29 when the rotor 21 is driven under prescribed conditions. Accordingly, that the rotor magnetic flux amount WB is less than the lower limit of the normal distribution range of the ideal value WB_id1 is substantially the same as the induced voltage IV is within the low induced voltage value range.

Meanwhile, if the results of the determination at step S53 indicate that the measured value WB_act for the rotor magnetic flux amount WB is the first rotor magnetic flux amount threshold WB_th1 or more, the current control unit 31 makes the process go to the next step S54.

At step S54, the current control unit 31 determines whether or not the measured value WB_act for the rotor magnetic flux amount WB is smaller than a second rotor magnetic flux amount threshold WB_th2.

Note that the second rotor magnetic flux amount threshold WB_th2 may be set to be an upper limit of the normal distribution range in which the ideal value WB_id1 for the rotor magnetic flux amount WB is the median and there are the upper and lower margins.

If the results of the determination at step S54 indicate that the measured value WB_act for the rotor magnetic flux amount WB is smaller than the second rotor magnetic flux amount threshold WB_th2, that is, if the measured value WB_act for the rotor magnetic flux amount WB is within a normal rotor magnetic flux amount WB (normal induced voltage value) range in which the measured value WB_act for the rotor magnetic flux amount WB converges in the normal distribution range, the current control unit 31 makes the process jump to step S56.

Meanwhile, if the results of the determination at step S54 indicate that the measured value WB_act for the rotor magnetic flux amount WB is the second induced voltage threshold WB_th2 or more, that is, if the measured value WB_act for the rotor magnetic flux amount WB is within a high rotor magnetic flux amount WB (high induced voltage value) range that is equal to or more than the upper limit of the normal distribution range, the current control unit 31 makes the process jump to step S57.

At step S55, the current control unit 31 applies first normalization information fit for the low rotor magnetic flux amount WB (low induced voltage value) as normalization information set in the information setting section 33.

At step S56, the current control unit 31 applies second normalization information fit for the normal rotor magnetic flux amount WB (normal induced voltage value) as normalization information set in the information setting section 33.

At step S57, the current control unit 31 applies third normalization information fit for the high rotor magnetic flux amount WB (high induced voltage value) as normalization information set in the information setting section 33.

At step S58, the controller 15 uses the voltage command values Vd1 and Vq1, which have been normalized by using one of the first to third normalization information, to execute drive control of the rotary electric machine 13.

Third Embodiment

FIG. 6 is a flowchart illustrating how a controller 15 according to the third embodiment works in which a measured value AG_act for the gap size AG is used as the rotary electric machine characteristic that is subject to normalization.

At step S61 of FIG. 6, the current control unit 31 acquires, as specific information, a measured value AG_act for the gap size AG. The measured value AG_act for the gap size AG may be acquired by obtaining the outer radius of the rotor 21 and the inner radius of the stator 23 and by subtracting the outer radius of the rotor 21 from the inner radius of the stator 23.

At step S62, the current control unit 31 acquires, as reference information, an ideal value AG_id1 for the gap size AG.

At step S63, the current control unit 31 determines whether or not the measured value AG_act (specific information) for the gap size AG as acquired at step S61 is larger than a first gap size threshold AG_th1 set based on the ideal value AG_id1 (reference information) for the gap size AG as acquired at S62.

Note that the first gap size threshold AG_th1 may be set to be an upper limit of a normal distribution range (corresponding to reference information) in which the ideal value AG_id1 for the gap size AG is the median and there are appropriate upper and lower margins.

If the results of the determination at step S63 indicate that the measured value AG_act for the gap size AG is larger than the first gap size threshold AG_th1, that is, if the measured value AG_act for the gap size AG is within a large gap size (low induced voltage value) range that exceeds the upper limit of the normal distribution range, the current control unit 31 makes the process jump to step S65.

Here, the gap size AG is highly inversely correlated to the induced voltage IV occurring in the stator coil 29 when the rotor 21 is driven under prescribed conditions. Accordingly, that the measured value AG_act for the gap size AG exceeds the upper limit of the normal distribution range (i.e., a large gap size) is substantially the same as the induced voltage IV is within the low induced voltage value range.

Meanwhile, if the results of the determination at step S63 indicate that the measured value AG_act for the gap size AG is the first gap size threshold AG_th1 or less, the current control unit 31 makes the process go to the next step S64.

At step S64, the current control unit 31 determines whether or not the measured value AG_act for the gap size AG is larger than a second gap size threshold AG_th2.

Note that the second gap size threshold AG_th2 may be set to be a low limit of the normal distribution range in which the ideal value AG_id1 for the gap size AG is the median and there are the upper and lower margins.

If the results of the determination at step S64 indicate that the measured value AG_act for the gap size AG is larger than the second gap size threshold AG_th2, that is, if the measured value AG_act for the gap size AG is within a normal gap size AG (normal induced voltage value) range in which the measured value AG_act for the gap size AG converges in the normal distribution range, the current control unit 31 makes the process jump to step S66.

If the results of the determination at step S64 indicate that the measured value AG_act for the gap size AG is the second gap size threshold AG_th2 or less, that is, if the measured value AG_act for the gap size AG is within a small gap size AG (high induced voltage value) range that is equal to or less than the lower limit of the normal distribution range, the current control unit 31 makes the process jump to step S67.

At step S65, the current control unit 31 applies first normalization information fit for the large gap size AG (low induced voltage value) as normalization information set in the information setting section 33.

At step S66, the current control unit 31 applies second normalization information fit for the normal gap size AG (normal induced voltage value) as normalization information set in the information setting section 33.

At step S67, the current control unit 31 applies third normalization information fit for the small gap size AG (high induced voltage value) as normalization information set in the information setting section 33.

At step S68, the controller 15 uses the voltage command values Vd1 and Vq1, which have been normalized by using one of the first to third normalization information, to execute drive control of the rotary electric machine 13.

[Method for Manufacturing Rotary Electric Machine System 11 According to Embodiment of the Present Invention]

Figure 7:
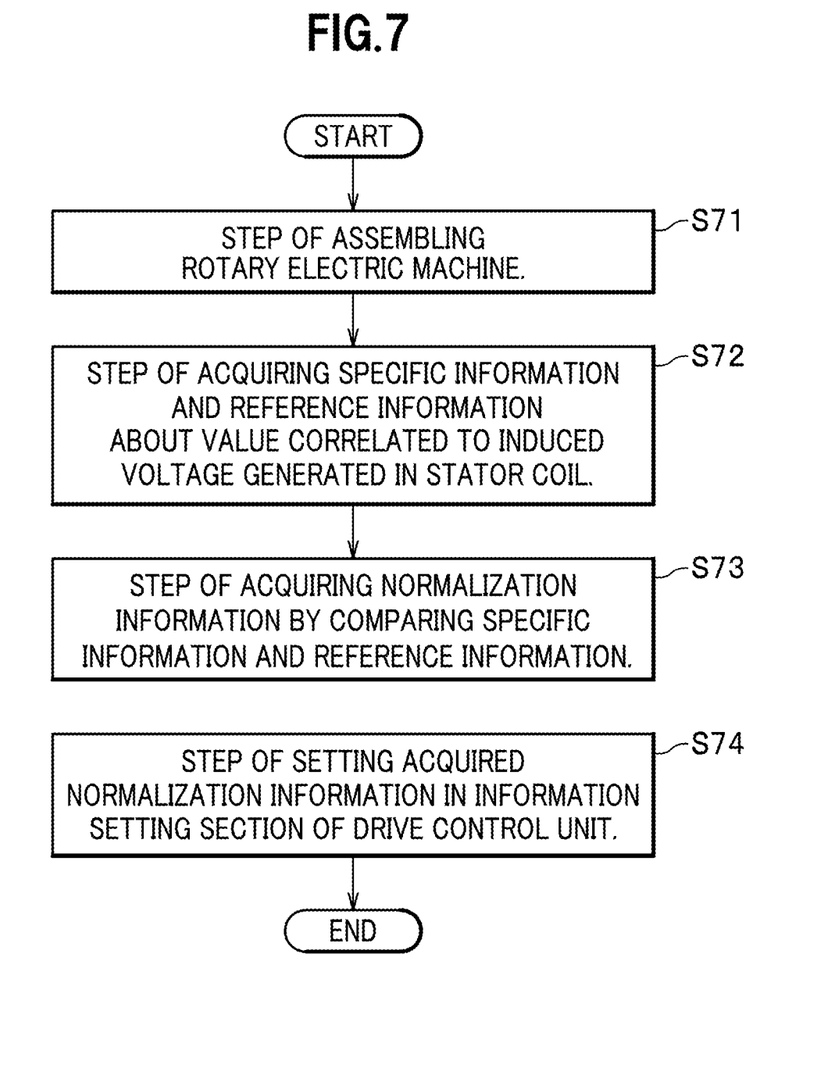
FIG. 7 is a schematic diagram illustrating the steps of a method for manufacturing a rotary electric machine system according to an embodiment of the present invention.

Next, with reference to FIG. 7, the following describes a method for manufacturing a rotary electric machine system 11 according to an embodiment of the present invention. FIG. 7 is a schematic diagram illustrating the steps of the method for manufacturing a rotary electric machine system 11 according to this embodiment.

At step S71 of FIG. 7, a step of assembling a rotary electric machine 13 is performed. At step S71, the assembly is performed such that there is a small gap 30 between the outer circumferential surface of a rotor 21 and the inner circumference surface of a stator 23, the rotor 21 having permanent magnets 25 embedded in a rotor core 22, the stator 23 having an annular stator core 27 with a plurality of teeth 28, each tooth being wound by a stator coil 29.

At step S72, performed is a step of acquiring specific information and reference information about a value correlated to an induced voltage IV occurring in the stator coil 29. At step S72, as the specific information about the value correlated to the induced voltage IV, a measured value IV_act for the induced voltage IV occurring in the stator coil 29 when the rotor 21 is driven under prescribed conditions, for instance, is acquired.

In addition, as the reference information about the value correlated to the induced voltage IV, an ideal value IV_id1 for the induced voltage IV occurring in the stator coil 29 when the rotor 21 is driven under prescribed conditions is acquired.

At step S73, performed is a step of deriving normalization information by comparing the specific information and the reference information as obtained in step S72. At step S73, the normalization information is derived by comparing, for instance, the measured value IV_act (specific information) for the induced voltage IV occurring in the stator coil 29 when the rotor 21 is driven under prescribed conditions and a normal distribution range (reference information) set based on the ideal value IV_id1 (reference information) for the induced voltage IV.

Note that the normalization information is information used to convert, to a drive control signal that can be fit (normalized) for normal operation of the rotary electric machine 13, a drive control signal that causes abnormal events (disturbance) during operation of the rotary electric machine 13 if the signal is used as it is.

At step S73, performed is a step of setting the normalization information derived at step S72 in the information setting section 33 of the current control unit 31. At step S73, the normalization information is set (stored) in the information setting section 33 included in the current control unit 31 of the controller 15, which constitutes a control element of the rotary electric machine system 11. This makes it possible to correct disturbance of operation accuracy in the rotary electric machine 13. This disturbance may be caused due to a characteristic specific to the rotary electric machine 13, which constitutes a machine element of the rotary electric machine system 11.

[Advantageous Effects of Rotary Electric Machine System 11 According to the Present Invention]

The following describes advantageous effects of each rotary electric machine system 11 according to the present invention.

The first aspect of the present invention provides a rotary electric machine system 11 including: a rotary electric machine 13 having a rotor 21 that is provided on a drive shaft 20 and is equipped with permanent magnets 25, a stator 23 facing the outer circumferential surface of the rotor 21 with a gap 30 therebetween, and a stator coil 29 by which each tooth 28 of the stator 23 is wound; and a controller (control unit) 15 configured to generate a drive control signal for the rotary electric machine 13 and execute drive control of the rotary electric machine 13 by using the drive control signal generated.

The controller (control unit) 15 is provided with an information setting section 33 configured to set normalization information (so as to normalize the drive control signal for the rotary electric machine 13) derived by comparing specific information about a value correlated to an induced voltage IV occurring in the stator coil 29 when the rotor 21 of the rotary electric machine 13 is driven under prescribed conditions and predetermined reference information about the value correlated to the induced voltage occurring in the stator coil 29. The normalization information is applied to the drive control signal generated and the resulting drive control signal normalized by the application is used to execute the drive control of the rotary electric machine 13.

In the invention of the rotary electric machine system 11 based on the first aspect, the controller (control unit) 15 applies, to the drive control signal for the rotary electric machine 13, the normalization information (so as to normalize the drive control signal for the rotary electric machine 13) derived by comparing specific information about a value correlated to an induced voltage IV occurring in the stator coil 29 when the rotor 21 of the rotary electric machine 13 is driven under prescribed conditions and predetermined reference information about the value correlated to the induced voltage IV occurring in the stator coil 29. Then, the drive control signal normalized by the application is used to execute the drive control of the rotary electric machine 13.

Note that the normalization information is information used to convert, to a drive control signal that can be fit (normalized) for normal operation of the rotary electric machine 13, a drive control signal that causes abnormal events (disturbance) during operation of the rotary electric machine 13 if the signal is used as it is.

According to the invention of the rotary electric machine system 11 based on the first aspect, because the drive control signal normalized with respect to the value correlated to the induced voltage IV occurring in the stator coil 29 when the rotor 21 of the rotary electric machine 13 is driven under prescribed conditions is used to execute the drive control of the rotary electric machine 13, a stable-quality rotary electric machine system, in which one or more rotary electric machine characteristics are normalized from various viewpoints, can be obtained.

A rotary electric machine system 11 according to the second aspect of the present invention is provided with: the rotary electric machine 13 having the rotor 21, the stator 23, and the stator coil 29; and the controller (control unit) 15 configured to generate a drive control signal for the rotary electric machine 13 and execute drive control of the rotary electric machine 13 by using the drive control signal generated. In view of the above, the constituting elements are largely shared with those of the rotary electric machine system 11 according to the first aspect of the present invention.

Here, a difference from the rotary electric machine system 11 according to the first aspect of the present invention is described. This can avoid redundancy to describe the rotary electric machine system 11 according to the second aspect of the present invention.

According to the second aspect of the present invention, the rotary electric machine system 11 further includes a controller (information acquiring unit) 15 configured to acquire specific information about a value correlated to an induced voltage IV occurring in the stator coil 29 when the rotor 21 of the rotary electric machine 13 is driven under prescribed conditions and acquire predetermined reference information about the value correlated to the induced voltage IV occurring in the stator coil 29. This point is the difference from the rotary electric machine system 11 according to the first aspect of the present invention.

According to the second aspect of the present invention, the rotary electric machine system 11 is further provided with the controller (information acquiring unit) 15 configured to acquire the specific information and the reference information about the value correlated to the induced voltage IV occurring in the stator coil 29. Because of this, the controller (information acquiring unit) 15 can be made to acquire the specific information and the reference information (or update content of the information) at a time point different from the time point when a vehicle is manufactured (e.g., when a vehicle is under maintenance).

According to the invention of the rotary electric machine system 11 based on the second aspect, it is possible to flexibly extend when and/or how to acquire the specific information and the reference information about the value correlated to the induced voltage IV occurring in the stator coil 29. This, in addition to the advantageous effects of the rotary electric machine system 11 based on the first aspect, enables the system to be built with excellent extendibility.

A rotary electric machine system 11 according to the third aspect of the present invention is based on the rotary electric machine system 11 according to the second aspect. However, the controller (information acquiring unit) 15 may be configured to acquire specific information based on a measured value IV_act for the induced voltage IV occurring in the stator coil 29 when the rotor 21 of the rotary electric machine 13 is driven under prescribed conditions.

In the invention of the rotary electric machine system 11 based on the third aspect, the controller (information acquiring unit) 15 is configured to acquire specific information based on a measured value IV_act for the induced voltage IV occurring in the stator coil 29 when the rotor 21 of the rotary electric machine 13 is driven under prescribed conditions. This makes it possible to apply, to the drive control signal for the rotary electric machine 13, accurate normalization information derived from accurate specific information.

According to the invention of the rotary electric machine system 11 based on the third aspect, the drive control signal accurately normalized by the application is used to execute the drive control of the rotary electric machine 13. This makes it possible to execute accurate operation of the rotary electric machine 13.

A rotary electric machine system 11 according to the fourth aspect of the present invention is based on the rotary electric machine system 11 according to the second aspect. However, the controller (information acquiring unit) 15 may be configured to acquire specific information based on a measured value WB_act for the rotor 21 magnetic flux amount WB.

According to the invention of the rotary electric machine system 11 based on the fourth aspect, the controller (information acquiring unit) 15 is configured to acquire specific information based on a measured value WB_act for the rotor 21 magnetic flux amount WB. When compared with the invention of the rotary electric machine system 11 based on the third aspect, a relatively easy means can be used to acquire a value correlated to the induced voltage IV occurring in the stator coil 29 when the rotor 21 is driven under prescribed conditions.

A rotary electric machine system 11 according to the fifth aspect of the present invention is based on the rotary electric machine system 11 according to the second aspect. However, the controller (information acquiring unit) 15 may be configured to acquire specific information based on a measured value AG_act for the gap size AG According to the invention of the rotary electric machine system 11 based on the fifth aspect, the controller (information acquiring unit) 15 is configured to acquire specific information based on a measured value AG_act for the gap size AG. When compared with the invention of the rotary electric machine system 11 based on the third aspect, a relatively easy means can be used to acquire a value correlated to the induced voltage IV occurring in the stator coil 29 when the rotor 21 is driven under prescribed conditions.

A rotary electric machine system 11 according to the sixth aspect of the present invention is based on the rotary electric machine system 11 according to the second aspect. However, the controller (information acquiring unit) 15 may be configured to acquire specific information based on both a measured value WB_act for the rotor 21 magnetic flux amount WB and a measured value AG_act for the gap size AG.

According to the invention of the rotary electric machine system 11 based on the sixth aspect, the controller (information acquiring unit) 15 is configured to acquire specific information based on both a measured value WB_act for the rotor 21 magnetic flux amount WB and a measured value AG_act for the gap size AG. When compared with the invention of the rotary electric machine system 11 based on the third aspect, a relatively easy means can be used to acquire a value correlated to the induced voltage IV occurring in the stator coil 29 when the rotor 21 is driven under prescribed conditions.

The seventh aspect of the present invention provides an electric vehicle carrying the rotary electric machine system 11 according to any one of the first to sixth aspects.

In the electric vehicle carrying the rotary electric machine system 11 according to the seventh aspect of the present invention, a stable-quality rotary electric machine system 11, in which one or more rotary electric machine characteristics are normalized from various viewpoints, is included. This enables an electric vehicle to be produced with stable driving power quality.

The eighth aspect of the present invention provides a method for manufacturing a rotary electric machine system 11 including: a rotary electric machine 13 having a rotor 21 that is provided on a drive shaft 20 and is equipped with permanent magnets 25, a stator 23 facing an outer circumferential surface of the rotor 21 with a gap 30 therebetween, and a stator coil 29 by which each tooth 28 of the stator 23 is wound; and a controller (control unit) 15 configured to generate a drive control signal for the rotary electric machine 13 and execute drive control of the rotary electric machine 13 by using the drive control signal generated.

According to the eighth aspect of the present invention, the method for manufacturing a rotary electric machine system 11 includes the steps of: acquiring specific information about a value correlated to an induced voltage IV occurring in the stator coil 29 when the rotor 21 of the rotary electric machine 13 is driven under prescribed conditions and acquiring predetermined reference information about the value correlated to the induced voltage IV occurring in the stator coil 29; deriving normalization information, so as to normalize the drive control signal generated, by comparing the specific information and the reference information; and setting the derived normalization information in an information setting section 33 of the controller (control unit) 15.

In the method for manufacturing a rotary electric machine system 11 according to the eighth aspect of the present invention, the specific information and the reference information about a value correlated to the induced voltage IV occurring in the stator coil 29 when the rotor 21 of the rotary electric machine 13 is driven under prescribed conditions are acquired; the normalization information is derived by comparing the acquired specific information and reference information; and the derived normalization information is set in the information setting section 33 of the controller (control unit) 15.

The controller (control unit) 15 of the rotary electric machine system 11 applies the normalization information set in the information setting section 33 to the drive control signal for the rotary electric machine 13. Then, the drive control signal normalized by the application is used to execute the drive control of the rotary electric machine 13.

According to the invention of the rotary electric machine system 11-manufacturing method based on the eighth aspect, it is possible to realize a rotary electric machine system-manufacturing method applicable to mass production of a stable-quality rotary electric machine system 11, in which one or more rotary electric machine characteristics are normalized from various viewpoints.

Other Embodiments

The above-described embodiments are examples to be embodied in the present invention. Accordingly, they should not be construed such that the technical scope of the present invention is limited. This is because the present invention can be put into practice, without departing from the spirit and the main features thereof, even in various embodiments.

REFERENCE SIGNS LIST

11 Rotary electric machine system
13 Rotary electric machine
15 Controller (control unit, information acquiring unit)
21 Rotor
23 Stator
28 Tooth
29 Stator coil
30 Gap
33 Information setting section
AG Gap size
IV Induced voltage
WB Rotor magnetic flux amount

The invention claimed is:

1. A rotary electric machine system comprising:
a rotary electric machine including a rotor that is provided on a drive shaft and is equipped with permanent magnets, a stator disposed to face an outer circumferential surface of the rotor with a gap therebetween, and a stator coil wound around each tooth of the stator; and
a control unit configured to generate a drive control signal for the rotary electric machine and execute drive control of the rotary electric machine by using the drive control signal generated,
the control unit comprising an information setting section to which normalization information to normalize the drive control signal for the rotary electric machine is set, the normalization information being derived by comparing specific information about a value correlated to an induced voltage generated in the stator coil when the rotor of the rotary electric machine is driven under prescribed conditions and predetermined reference information about the value correlated to the induced voltage generated in the stator coil,
wherein the normalization information is applied to the drive control sig to execute the d rive control of the rotary electric machine.

2. A rotary electric machine system comprising:
a rotary electric machine including a rotor that is provided on a drive shaft and is equipped with permanent magnets, a stator disposed to face an outer circumferential surface of the rotor with a gap therebetween and a stator coil wound around each tooth of the stator; and
a control unit configured to generate a drive control signal for the rotary electric machine and execute drive control of the rotary electric machine by using the drive control signal generated,
the system further comprising an information acquiring unit configured to acquire specific information about a value correlated to an induced voltage occurring in the stator coil when the rotor of the rotary electric machine is driven under prescribed conditions and acquire predetermined reference information about the value correlated to the induced voltage occurring in the stator coil,
wherein the control unit is configured to normalize the drive control signal for the rotary electric machine on the basis of comparison between the specific information and the reference information and the normalized drive control signal is used to execute the drive control of the rotary electric r machine.

3. The rotary electric machine system according to claim 2, wherein the information acquiring nit is configured to acquire the specific information based on a measured value for the induced voltage occurring in the stator coil when the rotor of the rotary electric machine is driven under prescribed conditions.

4. The rotary electric mach rye system according to claim 2, wherein the information acquiring unit is configured to acquire the specific information based on a measured value for an amount of magnetic flux in the rotor.

5. The rotary electric machine system according to claim 2, wherein the information acquiring unit is configured to acquire the specific information based on a measured value for a size of the gap.

6. The rotary electric machine system according to claim 2, wherein the information acquiring unit is configured to acquire information about a value correlated to the induced voltage, the value being based on both a measured value for an amount of magnetic flux in the rotor and a measured value for a size of the gap.

7. An electric vehicle comprising the rotary electric machine system according to claim 1.

8. A method for manufacturing a rotary electric machine system including: a rotary electric machine including a rotor that is provided on a drive shaft and is equipped with permanent magnets, a stator disposed to face an outer circumferential surface of the rotor with a gap therebetween, and a stator coil by which each tooth of the stator is wound; and a control unit configured to generate a drive control signal for the rotary electric machine and execute drive control of the rotary electric machine by using the drive control signal generated, the method comprising the steps of:

acquiring specific information about a value correlated to an induced voltage occurring in the stator coil when the rotor of the rotary electric machine is driven under prescribed conditions and acquiring'predetermined reference information about the value correlated to the induced voltage occurring in the stator coil;

deriving normalization information, so as to normalize the drive control signal generated, by comparing the specific information and, the reference information; and setting the derived normalization information in an information setting section of the control unit, so that the control unit of the rotary electric machine system can apply the normalization information to the drive control signal for the rotary electric machine and the resulting drive control signal normalized by the application is used to execute the drive control of the rotary electric machine.

* * * * *